United States Patent [19]
Saidi et al.

[11] Patent Number: 6,048,645
[45] Date of Patent: Apr. 11, 2000

[54] METHOD OF PREPARING LITHIUM ION ELECTROCHEMICAL CELLS

[75] Inventors: Mohamed-Yazid Saidi, Parkway; Jeffrey L. Swoyer, Henderson, both of Nev.

[73] Assignee: Valence Technology, Inc., Henderson, Nev.

[21] Appl. No.: 08/915,990

[22] Filed: Aug. 21, 1997

[51] Int. Cl.$^7$ ...................................................... H01M 4/02
[52] U.S. Cl. ...................................... 429/231.95; 429/224
[58] Field of Search ................................. 429/231.95, 224

[56] References Cited

U.S. PATENT DOCUMENTS

| | | | |
|---|---|---|---|
| 5,196,279 | 3/1993 | Tarascon | 429/194 |
| 5,425,932 | 6/1995 | Tarascon | 423/599 |
| 5,554,462 | 9/1996 | Flandrois et al. | 429/218 |
| 5,558,961 | 9/1996 | Doeff et al. | 429/224 |
| 5,561,006 | 10/1996 | Lecerf et al. | 429/218 |
| 5,561,007 | 10/1996 | Saidi et al. | 429/224 |
| 5,567,401 | 10/1996 | Doddapaneni et al. | 423/179.5 |

OTHER PUBLICATIONS

Miura et al. Electrochimica Acta, vol.41, No.2, pp 249–256, 1996, Mar. 13, 1995.

J.M. Tarascon and D. Guyomard, "Li Metal–Free Rechargeable Batteries Based on $Li_{1+x}Mn_2O_4$ Cathodes ($0 \leq x \leq 1$) and Carbon Anodes," The Electrochemical Society, Inc., vol. 138, No. 10, 2864–2868 Oct. (1991).

J.M. Tarascon, et al, "The Spinel Phase of $LiMn_2O_4$ as a Cathode in Secondary Lithium Cells," The Electrochemical Society, Inc., vol. 138, No. 10, 2859–2864 Oct. (1991).

M.N. Richard, E.W. Fuller, J.R. Dahn, "The Effect of Ammonia Reduction on the Spinel Electrode Materials, $LiMn_2O_4$ and $Li(Li_{1/3}Mn_{5/3}O_4$," Solid State Ionics, vol. 73, 81–91 Mar. (1994).

D. Guyomard and J.M. Tarascon, "The Carbon/$Li_{1+x}Mn_2O_4$ System," Solid State Ionics, vol. 69, 222–237 (1994). No month available.

J.M. Tarascon, et al, "Synthesis Conditions and Oxygen Stoichiometry Effects on Li Insertion into the Spinel $Li_2Mn_2O_4$," Journal Electrochemical Society, vol. 141, No. 6, 1421–1431, Jun. (1994).

Yuan Gao and J.R. Dahn, "Synthesis and Characterization of $Li_{1+x}Mn_{2-x}O_4$ for Li–Ion Battery Applications," The Electrochemical Society, Inc., vol. 143, No.1, 100–114 Jan. (1996).

*Primary Examiner*—Maria Nuzzolillo
*Assistant Examiner*—Monique M. Wills
*Attorney, Agent, or Firm*—Young & Basile, P.C.

[57] ABSTRACT

In one embodiment, the invention provides a novel active material which is a lithium-rich, manganese oxide active material in the form of a single phase tetragonal crystal structured $Li_2Mn_2O_4$ compound having lattice parameters a=b=5.665 Å±0.003 Å, and c=9.265 Å±0.003 Å. A unique characteristic of the compound is that when lithium ions are deintercalated (extracted) from the $Li_2Mn_2O_4$ at first and second voltage plateaus, the crystal structure is transformed to a cubic structure characterized by lattice parameters a=b=c=8.235 Å±0.004 Å. On subsequent charge and discharge of the battery, corresponding to subsequent extraction and reinsertion of lithium into the electrode material at the second voltage plateau, the cubic structure is maintained.

18 Claims, 6 Drawing Sheets

METHOD OF PREPARING LITHIUM ION ELECTROCHEMICAL CELLS

FIELD OF THE INVENTION

This invention relates to electrochemical cells and batteries, and more particularly, to improved electrode active material for such batteries, and novel methods of synthesis.

BACKGROUND OF THE INVENTION

Lithium batteries are prepared from one or more lithium electrochemical cells. Such cells have included an anode (negative electrode), of metallic lithium, a cathode (positive electrode) typically a transition metal chalcogenide, and an electrolyte interposed between electrically insulated, spaced-apart, positive and negative electrodes. The electrolyte typically comprises a salt of lithium dissolved in one or more solvents, typically nonaqueous (aprotic) organic solvents. By convention, during discharge of the cell, the negative electrode of the cell is defined as the anode. During use of the cell, lithium ions (Li+) are transferred to the negative electrode on charging. During discharge, lithium ions (Li+) are transferred from the negative electrode (anode) to the positive electrode (cathode). Upon subsequent charge and discharge, the lithium ions (Li+) are transported between the electrodes. Cells having metallic lithium anode and metal chalcogenide cathode are charged in an initial condition. During discharge, lithium ions from the metallic anode pass through the liquid electrolyte to the electrochemically active material of the cathode whereupon electrical energy is released. During charging, the flow of lithium ions is reversed and they are transferred from the positive electrode active material through the ion conducting electrolyte and then back to the lithium negative electrode.

The lithium metal anode has been replaced with a carbon anode, that is, a carbonaceous material such as non-graphitic amorphous coke, graphitic carbon, or graphites, which are intercalation compounds. This presents a relatively advantageous and safer approach to rechargeable lithium as it replaces lithium metal with a material capable of reversibly intercalating lithium ions, thereby providing the "rocking chair" battery in which lithium ions "rock" between the intercalation electrodes during the charging/discharging/recharging cycles. Such lithium metal free cells may thus be viewed as comprising two lithium ion intercalating (absorbing) electrode "sponges" separated by a lithium ion conducting electrolyte, usually comprising a lithium salt dissolved in nonaqueous solvent or a mixture of such solvents. Numerous such electrolytes, salts, and solvents are known in the art. Such carbon anodes may be prelithiated prior to assembly within the cell having the cathode intercalation material. Since anode prelithiation is difficult, it is more common to have the lithium contained in the positive electrode. Lithium metal chalcogenide materials such as lithium manganese oxide, lithium nickel oxide and lithium cobalt oxide are common positive electrode active materials. Among these, lithium manganese oxide is preferred.

Methods of synthesis for $Li_1Mn_2O_4$ compounds are known and are reactions generally between stoichiometric quantities of a lithium containing compound and a manganese containing compound, exemplified by a lithium salt and manganese oxide. See Hunter, U.S. Pat. No. 4,246,253. However, such compounds prepared by conventional methods have a disadvantage in that the charge capacity of a cell comprising a cathode of such compounds suffers a progressive loss in capacity as the number of cycles of such cell increases. That is, although the initial capacity may be an acceptable value, such initial capacity value is diminished upon the first cycle of operation and such capacity further diminishes on every successive cycle of operation. Such capacity fading is well known.

In U.S. Pat. No. 4,828,834, Nagaura, et al, attempted to reduce capacity fading by sintering precursor lithium and manganese materials and thereby forming an $LiMn_2O_4$ intercalation compound. However, Nagaura's $LiMn_2O_4$ compounds were not fully crystallized spinel electrodes and suffered from a very low capacity. Similar to Nagaura, Tarascon, U.S. Pat. No. 5,425,932, shows a process for producing lithium manganese oxide which requires heating precursors in an evacuated, sealed ampoule. The cooling occurs at a very slow rate over a period of 4 to 6 days, using strictly controlled conditions, while the ampoule remains sealed. The complexity of this process and the control required are self-evident.

Despite the above approaches, there remains the difficulty of obtaining lithium manganese oxide (LMO) based electrode materials having the attractive capacity of the basic spinel $Li_1Mn_2O_4$ intercalation compound, but without its disadvantage of significant capacity loss on progressive cycling. Therefore, what is needed is a new electrode active material. There is also needed a new process for preparing electrode active material which is economical and adaptable to commercial production processes and achieves good conversion of the starting materials to the final desired product.

SUMMARY OF THE INVENTION

In one embodiment, the invention provides a novel active material which is a lithium-rich, manganese oxide active material in the form of a single phase tetragonal crystal structured $Li_2Mn_2O_4$ compound having lattice parameters a=b=5.665 Å±0.003 Å, and c=9.265 Å±0.003 Å. A unique characteristic of the compound is that when lithium ions are deintercalated (extracted) from the $Li_2Mn_2O_4$ at first and second voltage plateaus, the crystal structure is transformed to a cubic structure characterized by lattice parameters a=b=c=8.235 Å±0.004 Å. On subsequent charge and discharge of the battery, corresponding to subsequent extraction and reinsertion of lithium into the electrode material at the second voltage plateau, the cubic structure is maintained.

In another embodiment, the invention provides a novel lithium-ion battery which comprises the positive electrode having an active material comprising the lithium-rich manganese oxide tetragonal structure $Li_2Mn_2O_4$ of the invention; and a negative electrode which also comprises an intercalation active material, preferably a carbonaceous active material. Preferably the negative electrode active material is selected from the group of non-graphitic amorphous coke, graphitic carbon, or graphites. Graphites are preferred intercalation negative electrode active materials.

In another embodiment, the invention provides a method of operating a lithium-ion battery which comprises providing a positive electrode having a lithium-rich active material comprising a single phase tetragonal lithium manganese oxide, represented by the nominal formula $Li_2Mn_2O_4$. The active material is characterized by first and second deintercalation voltage plateaus above about 3 volts. In the method of operation, lithium ions are deintercalated from the tetragonal lithium manganese oxide at the first and second voltage plateaus and transferred to the negative electrodes to charge the battery. This occurs at a voltage sufficient to transform the tetragonal lithium manganese oxide to a single phase cubic structure. Next, at least a portion of the transferred lithium ions are returned from the negative active material for reinsertion into the positive electrode to discharge the battery at the second voltage plateau while maintaining the single-phase cubic structure. Next, the battery is recharged by deintercalation of lithium ions from the positive electrode at the second voltage plateau, whereupon lithium ions are transferred back to the negative electrode active material to recharge the battery at the second voltage plateau while maintaining the single phase cubic structure of the positive electrode-active material. By the method of the invention, the amount of lithium reversibly cycled at the second plateau by the lithium-rich compound of the invention, is greater than the amount of lithium reversibly cycled at the second plateau by a conventional spinel.

The novel, air-stable tetragonal $Li_2Mn_2O_4$ of the invention is prepared in a series of steps which includes a critical quenching step. This quenching step "freezes" a tetragonal structure that would have been considered metastable, based on the conventional thinking. The surprising advantage of the quenching step, to maintain a tetragonal lithium-rich structure, is an unexpected, advantageous result.

The first step of the synthesis involves making an orthorhombic form of $LiMnO_2$. The nominal atomic proportions of the precursor orthorhombic compound correspond to that of the final tetragonal compound. However, they are characterized by completely different structures, and different chemical and electrochemical characteristics. Although electrochemically active, the $LiMnO_2$ does not have as much capacity as the tetragonal $Li_2Mn_2O_4$. Another key feature of the synthesis method is the use of a manganese precursor or manganese salt that will react to give the orthorhombic form of $LiMnO_2$. Desirably, the manganese precursor is $\gamma MnO_2$ (gamma $MnO_2$) or $\beta MnO_2$ (beta $MnO_2$). The manganese precursor need not contain oxygen, since oxygen will be incorporated from reaction in air. The invention will be described using an exemplary $\beta MnO_2$ precursor. The $\beta MnO_2$ is prepared from electrochemical manganese dioxide (EMD) which is heat-treated to an elevated temperature to obtain the Beta form. In the latter steps of the synthesis process, an overlithiation shifts the structure to its nominal lithium-rich stoichiometry at high temperature in the range of 800–1,000 degrees centigrade. Then, the composition is quenched from the high temperature to prevent any reversal to the former orthorhombic $LiMnO_2$ structure. The material so obtained has a high degree of purity with high capacity on the order of 290 milliamp hours per gram.

More specifically, the method of the invention comprises preparing the mixture of $MnO_2$ particles (powder) and lithium carbonate particles (powder), each in an amount sufficient to provide about one atomic unit of lithium for each atomic unit of manganese. Next, a first stepwise heating of the particle mixture is conducted to a first preferred temperature of about 600° C., and then to a second preferred temperature of about 845° C., in a protective atmosphere which is inert to slightly reducing. Next, the heated mixture is allowed to cool, and then it is ground. The ground particles are then mixed with particles of lithium carbonate. Next, the mixture of ground particles and lithium carbonate is heated in a second stepwise heating process to a first preferred temperature of about 600° C., and then to a second preferred temperature of about 975° C., also in a protective atmosphere. Finally, the particles are immediately quenched by rapid cooling at the completion of this second stepwise heating. It is preferred that the first stepwise heating comprises heating the mixture to a first temperature which is desirably at least about 550° C. and up to about 650° C., and then maintaining such temperature for about 12 hours. Next, the temperature is increased to a range of desirably at least about 650° C., more desirably at least about 750° C., and preferably about 800 to 900° C., and then maintained at such temperature for about 36 hours. Therefore, as can be seen, there is a desired temperature range around the preferred 600° C. value, and a desired range around the 845° C. value for the first heating step. The second stepwise heating is conducted by heating the mixture to a first temperature which is desirably at least about 550° C., and preferably no more than about 650° C.; and then maintaining said temperature for about 12 hours; and then increasing the temperature to a second temperature of about 900° C. to about 1050° C. and maintaining said temperature for about 36 hours. As can be seen, there is a desired temperature range around the preferred 600° C. and 975° C. in this second stepwise heating sequence. It is preferred that the temperature is increased in each stepwise heating at a ramp rate of about 2° C. per minute. There is also a desired range of 6 to 24 hours around the preferred 12 hours of holding period; and 24 to 72 hours around the preferred 36 hours of holding period. It is also preferred that the heating steps are conducted in a reaction vessel, and cooling is conducted by cooling an exterior surface of the reaction vessel with water or equivalent heat-transfer means, to a temperature of 100° C. or less. In one exemplary alternative, a precursor $Beta-MnO_2$ compound is prepared by heating electrochemical manganese dioxide (EMD) to a temperature of at least about 400° C.

The invention provides a substantial advantage over conventional methods of forming lithium manganese oxide. In conventionally formed lithium manganese oxide, a substantial proportion of the manganese is in the +4 oxidation state, thereby limiting the amount of lithium included. In contrast, in accordance with the method and compound of the invention, it is possible to have a higher proportion of manganese in the +3 state in the initial active material. This provides the ability to include an excess amount of lithium in the starting material. The term "excess lithium" indicates that there is additional lithium beyond the traditional atomic proportion of one unit of lithium per two units of manganese in conventional lithium manganese oxide. The presence of the excess lithium in the invention means that capacity loss, generally observed on cycling in conventional batteries, is offset. The novel tetragonal $Li_2Mn_2O_4$ of the invention has the unique ability to satisfy such capacity loss with the excess lithium. In other words, on cycling of the battery, the excess lithium may be irreversibly retained within the negative electrode, but yet, on cycling, a full unit of lithium may be cycled back between the anode and the cathode by the unique tetragonal $Li_2Mn_2O_4$ of the invention.

These and other objects, features, and advantages will become apparent from the following description of the preferred embodiments, claims, and accompanying drawings.

BRIEF DESCRIPTION OF THE DRAWINGS

In FIG. 3 there is shown the first cycle charge and discharge.

DETAILED DESCRIPTION OF THE PREFERRED EMBODIMENTS

Figure 1:
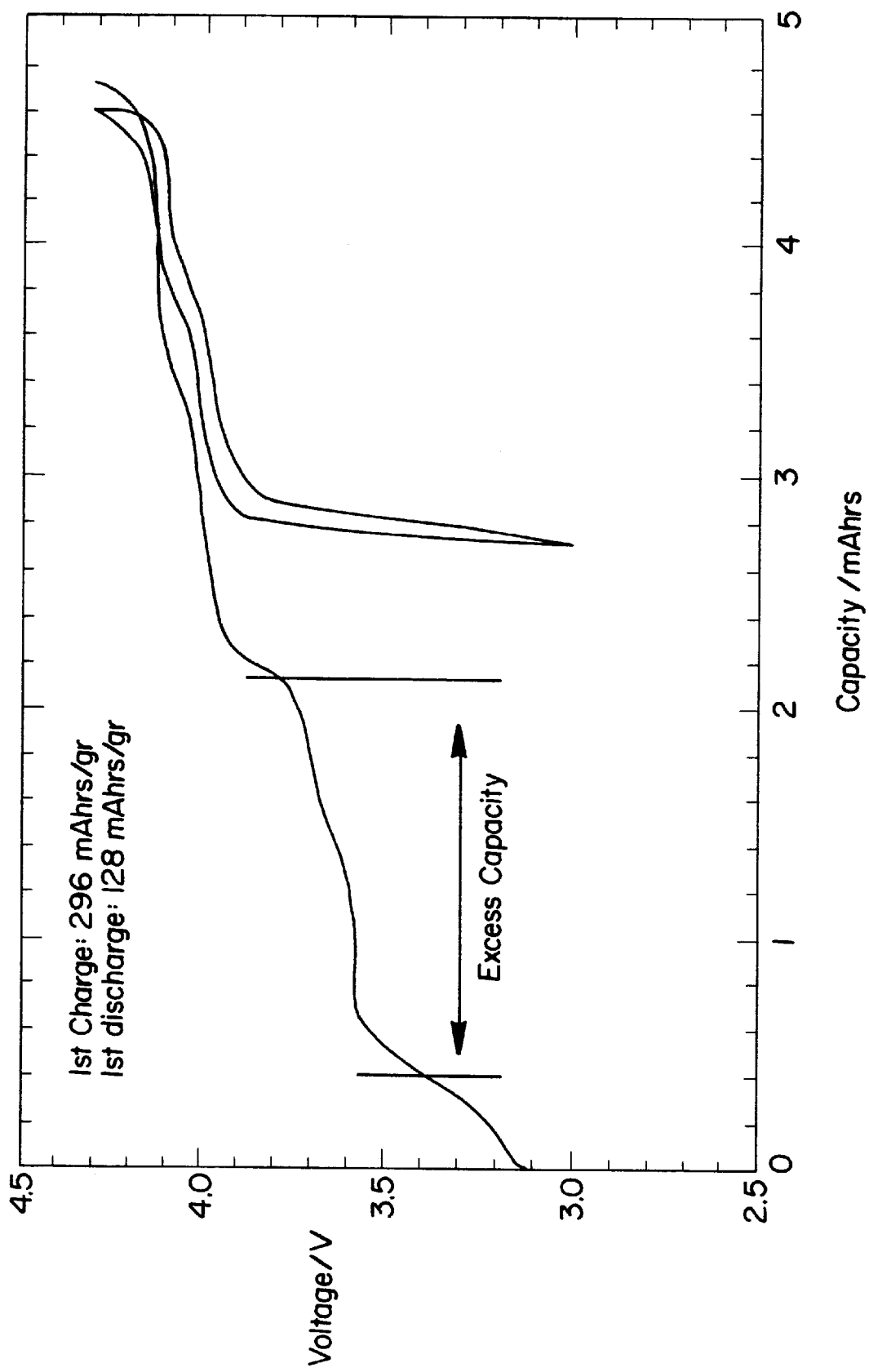
FIG. 1 shows a voltage profile, voltage/capacity plot of a test cell, based on tetragonal lithium manganese oxide ($Li_{2.2}Mn_2O_4$) electrode active material prepared according to the invention, and using a lithium metal counter-electrode. The data shown in FIG. 1 is based on the Electrochemical Voltage Spectroscopy (EVS) technique. The data is based on using constant current cycling at ±50 microamps per square centimeter, between 3.0 and 4.3 volts, using 15.5 milligrams of the lithium manganese oxide ($Li_{2.2}Mn_2O_4$) active material.

The present invention provides, for the first time, a lithium-rich manganese oxide which is air-stable, has a tetragonal crystal structure, and is represented by the nominal general formula $Li_2Mn_2O_4$. Alternatively, the nominal general formula of the tetragonal structure is represented by $Li_1Mn_2O_4$ where, in an as-prepared, initial condition, "x" is at least "2", and preferably greater than "2". This lithium-rich compound of the tetragonal structure is advantageously air-stable, and need not be maintained under protective atmosphere or protected from interaction with oxygen and humidity in the environment. When the compound $Li_2Mn_2O_4$ is cycled in a lithium battery, lithium is deintercalated from the compound for intercalation into a counter-electrode. The deintercalation occurs at two characteristic plateaus above about 3 volts and typically above about 3.5 volts. Such deintercalation is accompanied by a transformation to a cubic phase. Such cubic phase is maintained during subsequent charge and discharge. The lithium-rich tetragonal $Li_2Mn_2O_4$ of the invention is uniquely suited to compensate for first cycle loss observed when lithium is irreversibly retained in anode active material. The tetragonal $Li_2Mn_2O_4$ of the invention may be used as a sole active material, or mixed with another active material to enhance performance of the positive electrode.

In a preferred method, the compound of the nominal general formula, $Li_2Mn_2O_4$ is prepared chemically, in a chemical reaction, to provide a lithium-rich condition so that the $Li_1Mn_2O_4$ of the invention, in an as-prepared condition, has a quantity of lithium "x" which is equal to "2" or greater. The method of the invention provides, for the first time, an economical means for obtaining lithium-rich manganese oxide of the nominal formula, $Li_2Mn_2O_4$ in a specific tetragonal crystal structure. Advantageously, the lithium manganese oxide of the invention is lithium-rich, is prepared having a quantity of lithium far in excess of the conventional $Li_1Mn_2O_4$, is prepared by an efficient, economical means, and is air-stable.

The invention provides a substantial advantage over conventional methods of forming lithium manganese oxide, and over conventional lithium manganese oxide compounds. Before further describing the invention, it is useful to understand the problem to which the invention is directed. The technological hurdle associated with $Li_1Mn_2O_4$ was that it is only possible to use the 4-volt plateau. The 3-volt plateau would require a material with 2 lithiums per formula unit of the manganese oxide. This material was attempted to be prepared in the spinel form, and was found to be hygroscopic and decomposed when exposed to air and humidity in the air. This makes the synthesis of a lithium-rich spinel very difficult, and its use not feasible, as it has to be made under an inert atmosphere and kept under protective atmosphere. The invention, for the first time, provides an air-stable, lithium-rich composition, nominally $Li_2Mn_2O_4$, with two lithium ions per formula unit of the oxide. This compound has a tetragonal crystal structure. On charge, instead of a 3-volt plateau, a nucleation stage is observed in the region around 3.6 volts. The charge step occurring above about 3 volts is a clear indication of the air-stability of this material. The advantage of the new electrode active material is that a full, additional atomic unit of lithium is available for loss compensation, which typically occurs in electro-chemical cells. Thus, for the first time, an air-stable $Li_2Mn_2O_4$ is provided, with the surprisingly high 290 milliamp hours per gram capacity, and which is made and utilized effectively and economically due to its initial condition tetragonal form.

The novel, air-stable tetragonal $Li_2Mn_2O_4$ of the invention is prepared in a series of steps which includes a critical quenching step. This quenching step "freezes" a tetragonal structure that would have been considered metastable, based on the conventional thinking. The surprising advantage of the quenching step, to maintain a tetragonal lithium-rich structure, is an unexpected, advantageous result.

The first step of the synthesis involves making an orthorhombic form of $LiMnO_2$. The nominal atomic proportions of the precursor orthorhombic compound correspond to that of the final tetragonal compound. However, they are characterized by completely different structures, and different chemical and electrochemical characteristics. Although electrochemically active, the $LiMnO_2$ does not have as much capacity as the tetragonal $Li_2Mn_2O_4$. In one exemplary embodiment, the $\beta MnO_2$ is prepared from electro-chemical manganese dioxide (EMD) which is heat-treated to an elevated temperature to obtain the Beta form. In the latter steps of the synthesis process, an overlithiation shifts the structure to its nominal lithium-rich stoichiometry at high temperature in the range of 800–1,000 degrees centigrade. Then, the composition is quenched from the high temperature to prevent any reversal to the former orthorhombic $LiMnO_2$ structure. The material so obtained has a high degree of purity with high capacity on the order of 290 milliamp hours per gram.

The invention provides a substantial advantage over conventional methods of forming lithium manganese oxide. In conventionally formed lithium manganese oxide of the formula $Li_1Mn_2O_4$, the charge distribution is $Li^{+1}Mn^+_4Mn^{+3} O_4^{-2}$, corresponding to (+1, +4, +3, -8). In contrast, in accordance with the method and compound of the invention, it is possible to have a higher $Mn^{+3}$ content in the initial active material. This provides the ability to include an excess amount of lithium in the starting material corresponding to the increased amount of $Mn^{+3}$. The following charge distribution results: $Li_2^{+1}Mn^{+3}Mn^{+3}O_4^{-2}$, corresponding to (+2, +3, +3, −8). The term "excess lithium" indicates that there is additional lithium beyond the one unit of lithium contained in conventional $Li_1Mn_2O_4$. The presence of this excess lithium means that capacity loss, generally observed on cycling in conventional batteries containing, for example, carbon anodes, is offset. The novel tetragonal $Li_2Mn_2O_4$ of the invention has the unique ability to satisfy such capacity loss with the excess lithium. In other words, on cycling of the battery, the excess lithium may be irreversibly contained within the negative electrode, but yet, on cycling, a full unit of lithium may be cycled back between the cathode and anode.

In the method of the invention, it is preferred that the manganese compound and the lithium compound starting materials (precursors) be in powder, or particle form, and that the lithium compound particles be intermingled with the manganese compound particles in a desired proportion which provides the nominal general formula. In the multi-step process of the invention, an excess of lithium is used in the latter stages of the solid-state reaction. It is preferred that the lithium compound be selected from the group consisting of lithium hydroxide (LiOH), lithium nitrate ($LiNO_3$), lithium carbonate ($Li_2CO_3$), lithium acetate ($LiCH_3COO$), and lithium oxide ($Li_2O$). It is preferred that the lithium compound be lithium carbonate and the manganese compound be $MnO_2$. Prior to the solid-state reaction between the lithium compound and the preferred $\beta MnO_2$, the $\beta MnO_2$ must be prepared from a specific type of manganese dioxide, namely Electrochemical Manganese Dioxide (EMD). The $\beta MnO_2$ is prepared from EMD by heating the EMD to a temperature of about 400° C. to cause the transformation from $EMD-MnO_2$ to $\beta-MnO_2$.

Manganese dioxide has been derived from naturally occurring manganese dioxide (NMD) and synthetically produced manganese dioxide. Synthetic manganese dioxide is basically divided into two categories: electrolytic manganese dioxide (EMD) and chemical manganese dioxide (CMD). EMD is typically manufactured from direct electrolysis of an acid manganese sulfate and sulfuric acid. It is a high-purity, high-density, gamma manganese dioxide. The production of EMD involves an electrolysis process by which the gamma EMD is deposited directly on an anode electrode, which is typically made of titanium, lead alloy or carbon. The thickness of the $MnO_2$ deposited on the anode depends on the current density and the electrolysis time. The EMD deposit is removed from the anode, crushed, ground, washed, neutralized and dried in a rotary dryer. The process for manufacture of EMD and its properties are known and are recorded in *Batteries*, edited by Karl D. Kordesh, Marcel Dekker, Inc., New York, Vol. I, 1974, pp 433–488. The EMD is different from CMD. CMD is obtained by addition of an alkali permanganate solution to a boiling neutral manganese sulfate solution. The electrolytic manganese dioxide (EMD) undergoes a change in crystal structure during heat treatment. It exhibits a gamma phase at lower than about 250° C., a gamma-beta phase at about 250–350° C., and a beta phase at higher than about 350° C. It is thought that the maximum temperature for heat treatment is on the order of about 500° C., where Beta-$MnO_2$ decomposes to $Mn_2O_3$. The EMD is commercially available from M.M.M. Sedema of Belgium, and from Kerr-McGee, U.S.A. Commercially available EMD is generally 92.2% $MnO_2$; has an oxygen to manganese ratio of approximately 1:1.97; and contains impurities in the following maximum amounts: Fe: 60 ppm; Ca: 100 ppm; Ni: 11 ppm. The overall percent by weight of manganese is about 61 percent.

The reaction is a solid-state reaction between particles of the lithium compound precursor and particles of the preferred $\beta MnO_2$ precursor. By use of the $\beta MnO_2$ precursor and a compatible lithium compound precursor, it is possible to prepare a lithium-rich manganese oxide active material stabilized against decomposition in the presence of air and humidity.

Lithium manganese oxide electrode active materials were prepared and tested in electrochemical cells using a lithium metal counter-electrode. The results are reported in FIGS. 1–5. FIG. 6 contains a comparative conventional spinel. A typical cell configuration will be described with reference to FIG. 7.

Figure 6:
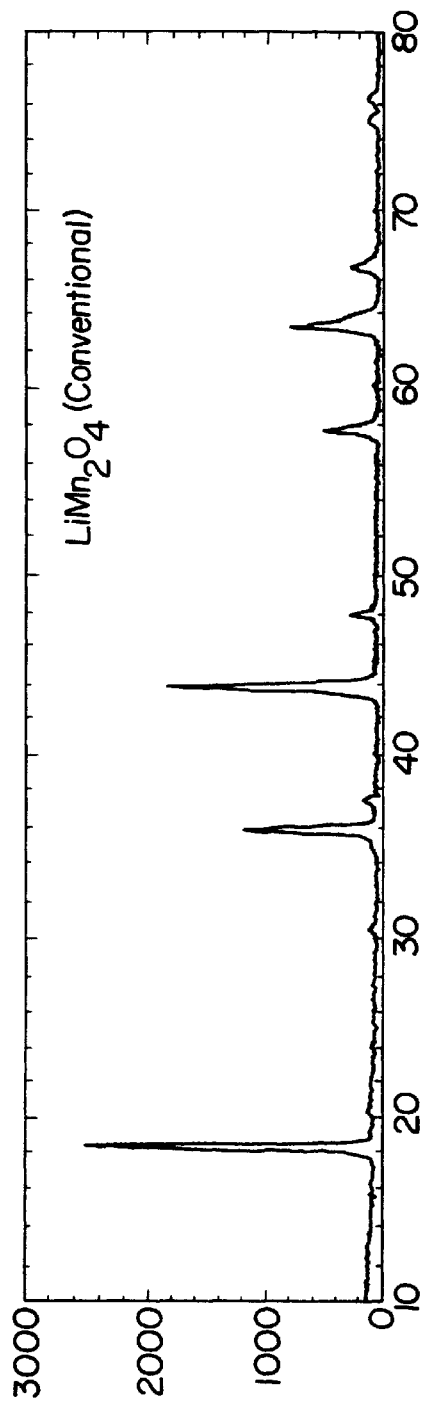
FIG. 6 shows an X-ray diffraction analysis of a conventional spinel $LiMn_2O_4$ conducted using conventional CuKα type radiation.
Figure 7:
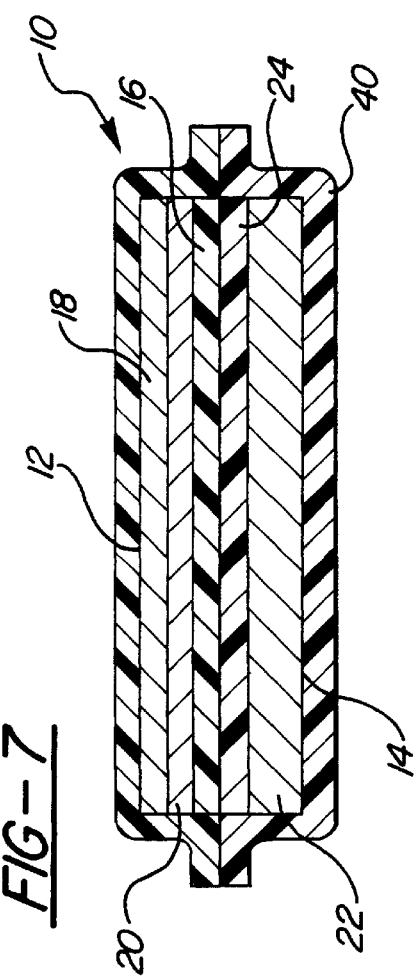
FIG. 7 is an illustration of a cross-section of a thin battery or cell embodying the invention.

The electrochemical cell or battery which uses the novel electrolyte solvent of the invention will now be described, with reference to FIG. 7. By convention, an electrochemical cell comprises a first electrode, a counter-electrode which reacts electrochemically with the first electrode, and an electrolyte which is capable of transferring ions between the electrodes. A battery refers to one or more electrochemical cells. Referring to FIG. 6, an electrochemical cell or battery 10 has a negative electrode side 12, a positive electrode side 14, and an electrolyte/separator 16 therebetween. The negative electrode is the anode during discharge, and the positive electrode is the cathode during discharge. The negative electrode side includes current collector 18, typically of nickel, iron, stainless steel, and copper foil, and negative electrode active material 20. The positive electrode side includes current collector 22, typically of aluminum, nickel, and stainless steel, and such foils may have a protective conducting coating foil and a positive electrode active material 24. The electrolyte/separator 16 is typically a solid electrolyte, or separator and liquid electrolyte. Solid electrolytes are typically referred to as polymeric matrixes which contain an ionic conductive medium. Liquid electrolytes typically comprise a solvent and an alkali metal salt which form an ionically conducting liquid. In this latter case, the separation between the anode and cathode is maintained, for example, by a relatively inert layer of material such as glass fiber. The electrolyte is not an essential feature of the invention. Essentially, any lithium ion containing conducting electrolyte may be used that is stable up to 4.5 volts or more. Essentially any method may be used to maintain the positive and negative electrodes spaced apart and electrically insulated from one another in the cell. Accordingly, the essential features of the cell are the positive electrode, a negative electrode electrically insulated from the positive electrode, and an ionically conducting medium between the positive and negative electrodes. Examples of a suitable separator/electrolyte, solvents, and salts are described in U.S. Pat. No. 4,830,939 showing a solid matrix containing an ionically conducting liquid with an alkali metal salt where the liquid is an aprotic polar solvent; and U.S. Pat. Nos. 4,935,317; 4,990,413; 4,792,504; 5,037,712; 5,418,091; 5,456,000; 5,460,904; 5,463,179; and 5,482,795. Each of the above patents is incorporated herein by reference in its entirety. Protective bagging material 40 covers the cell and prevents infiltration of air and moisture.

Electrodes of the invention are made by mixing a binder, the active material, and carbon powder (particles of carbon). The binder desirably is a polymer. A paste containing the binder, active material, and carbon is coated onto a current collector. The positive electrode comprises the lithium manganese oxide active material of the invention. For the positive electrode, the content is typically as follows: 50 to 90 percent by weight active material; 5 to 30 percent carbon black as the electric conductive diluent; and 3 to 20 percent binder, preferably chosen to enhance ionic conductivity. Stated ranges are not critical. The amount of active material may range from 25 to 85 weight percent. These materials are mixed and blended together with a solvent. Xylene is a suitable solvent. The mixture is then coated onto a current collector to achieve the desired thickness for the final electrode. The negative electrode of the invention preferably comprises about 80 to about 95 percent by weight of the specific graphite, and more preferably about 95 percent by weight, with the balance constituted by the binder. Preferably, the anode is prepared from a graphite slurry using polyvinylidene difluoride (PVDF) in a solvent along with the carbon particles. The slurry is coated onto a current collector using conventional application techniques.

The electrolyte used to form a completed cell may comprise any of a number of solvents, such as ethylene carbonate (EC), dimethyl carbonate (DMC), and mixtures thereof. The solvent contains typically a one molar solution of a lithium metal salt, such as $LiPF_6$. The positive and negative electrodes are maintained in a separated, spaced apart condition using a fiberglass layer or separator of an equivalent design.

The electrochemical cell, which utilizes the positive electrode active material prepared according to the invention, may be prepared in a variety of ways. In one embodiment, the negative electrode may be metallic lithium. In more desirable embodiments, the negative electrode is an intercalation active material, such as metal oxide or graphite. When a metal oxide active material is used, the components of the electrode are the metal oxide, electrically conductive carbon and binder, in proportions similar to that described above. In a preferred embodiment, the negative electrode active material is graphite particles. For test purposes, test cells were fabricated using lithium metal electrodes. When forming cells for use as rechargeable batteries, it is preferred to use an intercalation metal oxide positive electrode and a graphitic carbon negative electrode.

Various methods for fabricating electrochemical cells and batteries, and for forming electrode components, are further described immediately below. The invention is not, however, limited by any particular fabrication method as the novelty lies in the unique electrolyte. Accordingly, additional methods for preparing electrochemical cells and batteries may be selected and are described in the art; for example, in U.S. Pat. No. 5,435,054 (Tonder & Shackle); U.S. Pat. No. 5,300,373 (Shackle); U.S. Pat. No. 5,262,253 (Golovin); U.S. Pat. Nos. 4,668,595; 4,830,939 (Lee & Shackle); and particularly U.S. Pat. Nos. 5,418,091; 5,456,000; 5,460,904; and 5,540,741 assigned to Bell Communications Research. Each of the above patents is incorporated herein by reference in its entirety.

EXAMPLE I

In an initial step, $EMD-MnO_2$ was used to form $\beta-MnO_2$. The $EMD-MnO_2$ is a spinel phase which is heated to about 400° C. to achieve transformation to the Beta form.

The precursor manganese compound was the $\beta MnO_2$ (beta-manganese dioxide), and the precursor lithium compound was lithium carbonate ($Li_2CO_3$). Both compounds were in powder form and 23.55 grams of the manganese dioxide and 20 grams of the lithium carbonate powders were mixed together. Stoichiometric amounts of both precursors were used to make the precursor $LiMnO_2$ material. Both powders were ball-milled gently in a polyethylene container for about one hour to achieve thorough mixing of the two components.

The mixture of starting materials was heated in a stepwise fashion at a ramp rate of about 2° C. per minute to a first temperature of about 600° C. The 600° C. temperature was maintained for about 12 hours, and then the temperature was increased, again in stepwise fashion at the aforesaid rate, to 845° C. The 845° C. was maintained for about 36 hours. The synthesis was performed under a protective atmosphere of flowing argon/hydrogen gas at a ratio of 97%/3%. The flow rate was approximately 25 cubic centimeters per minute. This provided a relatively nonoxidizing atmosphere. Next, the orthorhombic $LiMnO_2$ intermediate material thus formed was ground to break up agglomerated particles. The ground material was then mixed with lithium carbonate and then pelletized to make into pellets. The amount of lithium carbonate included at this stage was between 15 and 30 percent excess, as compared to the stoichiometric amount needed to provide the nominal general formula of the final tetragonal $Li_2Mn_2O_4$ of the invention. The pelletized combination was then heated to about 600° C., again using the aforesaid ramp rate. The mixture was then held at about 600° C. for about 12 hours. Then, the temperature was increased to about 975° C., again using the aforesaid ramp rate, from 600° C. to 975° C. Then, the mixture was maintained at about 975° C. for about 36 hours. The reaction mixture was then taken into open air and rapidly cooled down, quenched, by immersing the vessel in water. The resulting product of the invention, nominally $Li_2Mn_2O_4$, was reground and prepared for X-ray analysis and for analytical analysis.

An electrode cathode was fabricated by solvent casting a slurry of the lithium manganese oxide of the invention, conductive carbon, binder, plasticizer, and solvent. The lithium manganese oxide used was prepared as per the above example, nominally $Li_2Mn_2O_4$. The conductive carbon used was Super P (MMM carbon). The binder was a copolymer sold under the trade name Kynar Flex 2801®; it is an 88:12 copolymer of polyvinylidene difluoride (PVDF) and hexafluoropropylene (HFP). A conventional plasticizer and an electronic grade solvent were also used. The slurry was cast onto glass, and a free-standing electrode was formed as the casting solvent evaporated. The slurry composition was approximately as follows:

| Component | Wet Weight % | Dry Weight % |
|---|---|---|
| $Li_2Mn_2O_4$ | 28.9 | 65.0 |
| Graphite | 2.5 | 5.5 |
| Binder | 4.5 | 10.0 |
| Plasticizer | 8.7 | 19.5 |
| Solvent | 55.4 | — |
| Total | 100.0 | 100.0 |

The counter-electrode was lithium metal. A glass fiber separator was used between the electrodes to prevent them from electrically shorting. An electrochemical cell of the first electrode, separator, and counter-electrode was formed. The electrolyte used to form the completed final cell or battery comprised a solution of ethylene carbonate (EC) and dimethyl carbonate (DMC), the weight ratio was 2:1 of EC:DMC, and $LiPF_6$ was used as the salt.

TEST RESULTS

FIG. 1 shows the voltage profile versus capacity of a rechargeable cell comprising a lithium metal anode and the cathode active material prepared according to the invention, $Li_2Mn_2O_4$. The cell was tested under EVS conditions where the conditions are equivalent to very slow cycling regime (nominally 50 microamps per square centimeter). The "X" axis represents the capacity relative to the lithium manganese oxide electrode, or the amount of charge corresponding to the insertion/extraction of lithium. The electrode was prepared according to the example. The data shown in FIG. 1 is based on the Electrochemical Voltage Spectroscopy (EVS) technique. Electrochemical and kinetic data were recorded using the Electrochemical Voltage Spectroscopy (EVS) technique. Such technique is known in the art as described by J. Barker in Synth., Met.28, D217 (1989); Synth. Met. 32, 43 (1989); J. Power Sources, 52, 185 (1994); and Electrochemica Acta, Vol. 40, No. 11, at 1603 (1995).

FIG. 1 clearly shows and highlights the very high and unexpected degree of reversibility of the lithium ion reactions of the $Li_2Mn_2O_4$ active material of the invention. FIG. 1 clearly shows and highlights the excess quantity of lithium about equal to 1–1.25 extra lithium, which is in excess of the amount of lithium present in a conventional $LiMn_2O_4$ active material. The excess capacity is indicated by the arrow.

The excess capacity is evident on first cycle charging when an irreversible quantity of lithium ions was removed from the positive electrode active material $Li_2Mn_2O_4$ for delivery to the negative electrode. The initial capacity, at about 290 milliamp hours per gram, was greater than the reversible capacity of about 128 milliamp hours per gram, with the difference signifying the lithium irreversibly removed, constituting the excess capacity. Upon subsequent charge and discharge, the amount of lithium which reversibly reintercalates into the positive electrode, is thought to be equal to about 0.86 atomic unit of lithium.

Further, with regard to FIG. 1, the excess capacity was the whole portion of the curve before the voltage hits 3.9 volts, at which point the active material constitutes $Li_1Mn_2O_4$, approximately. The first portion shows the transition going from the tetragonal phase up to about 3.6 volts, then the nucleation of the cubic phase occurs, leading to a plateau where two phases co-exist together. This was followed by an increasing voltage profile up to about 3.9 volts. This indicated a single phase region, the cubic phase. The single cubic phase corresponded to the normal voltage profile of the spinel, which was maintained during subsequent cycling of the cell.

On charge, the tetragonal $Li_2Mn_2O_4$ gives up one lithium, above three volts. This is unlike a conventionally prepared spinel $Li_1Mn_2O_4$, which gives up its first lithium around 2.9 volts. Because the lithium deintercalation of the tetragonal occurs at about 3.6 volts or above, the tetragonal material of the invention is considered to be air-stable. This is because the potential at deintercalation is greater than the potential for the decomposition of water. Consequently, the conventionally prepared spinel $Li_1Mn_2O_4$, with deintercalation at about 2.9 volts, and under 3 volts, is not air-stable and is not practical for use in electrochemical cells.

Figure 2:
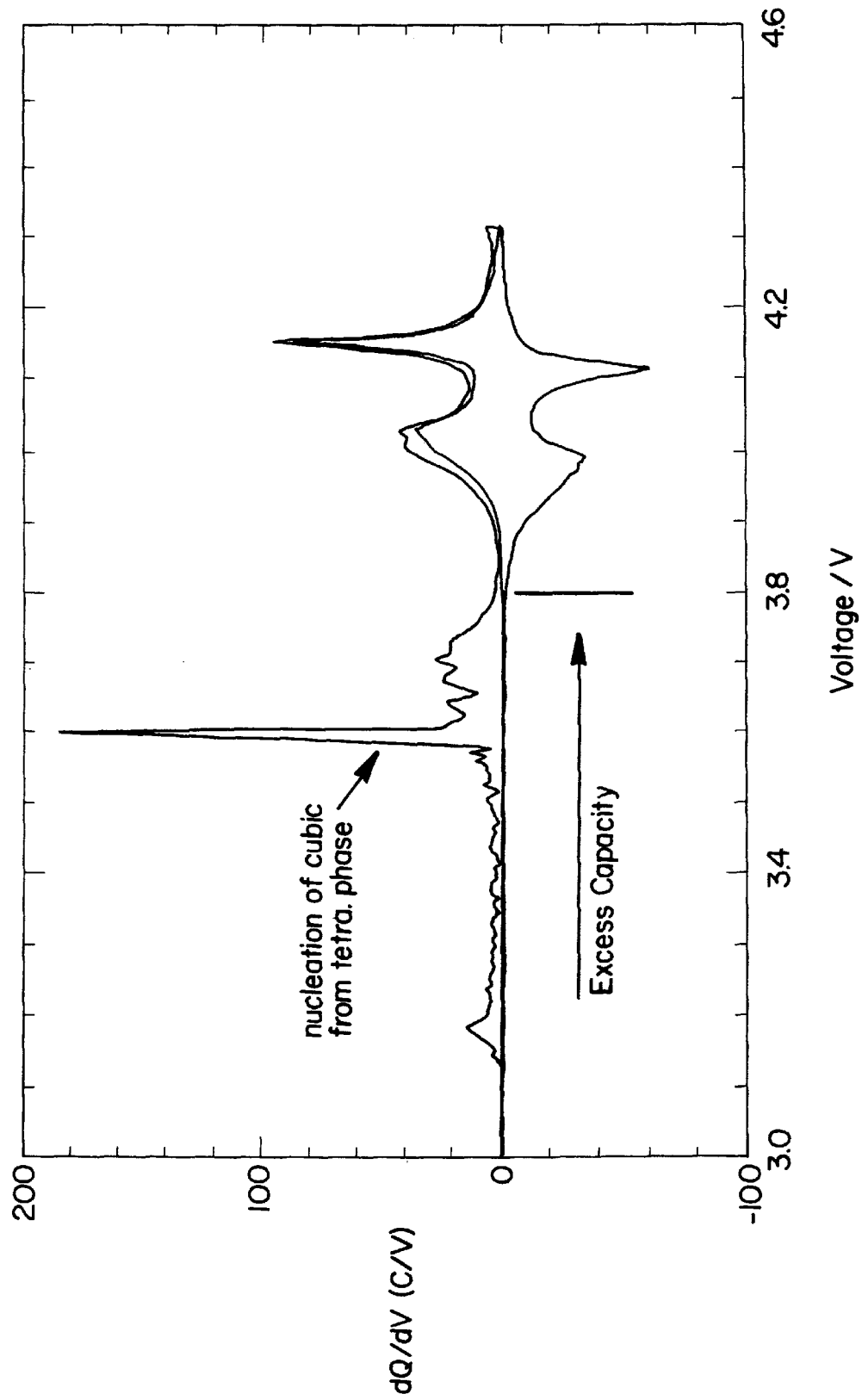
FIG. 2 is a differential capacity plot of FIG. 1, also based on the EVS procedure, and is a derivative of the curve of FIG. 1.

FIG. 2 is an EVS of a differential capacity plot based on FIG. 1. The excess capacity available from the positive electrode material $Li_2Mn_2O_4$, is identified by an arrow in FIG. 2. As can be seen, this excess capacity is irreversible, as subsequent symmetrical nature of the peaks show the reversibility on charge and discharge. The one peak related to irreversible reaction is the excess capacity. All other peaks above the axis (cell charge) have corresponding peaks below the axis (cell discharge).

Figure 3:
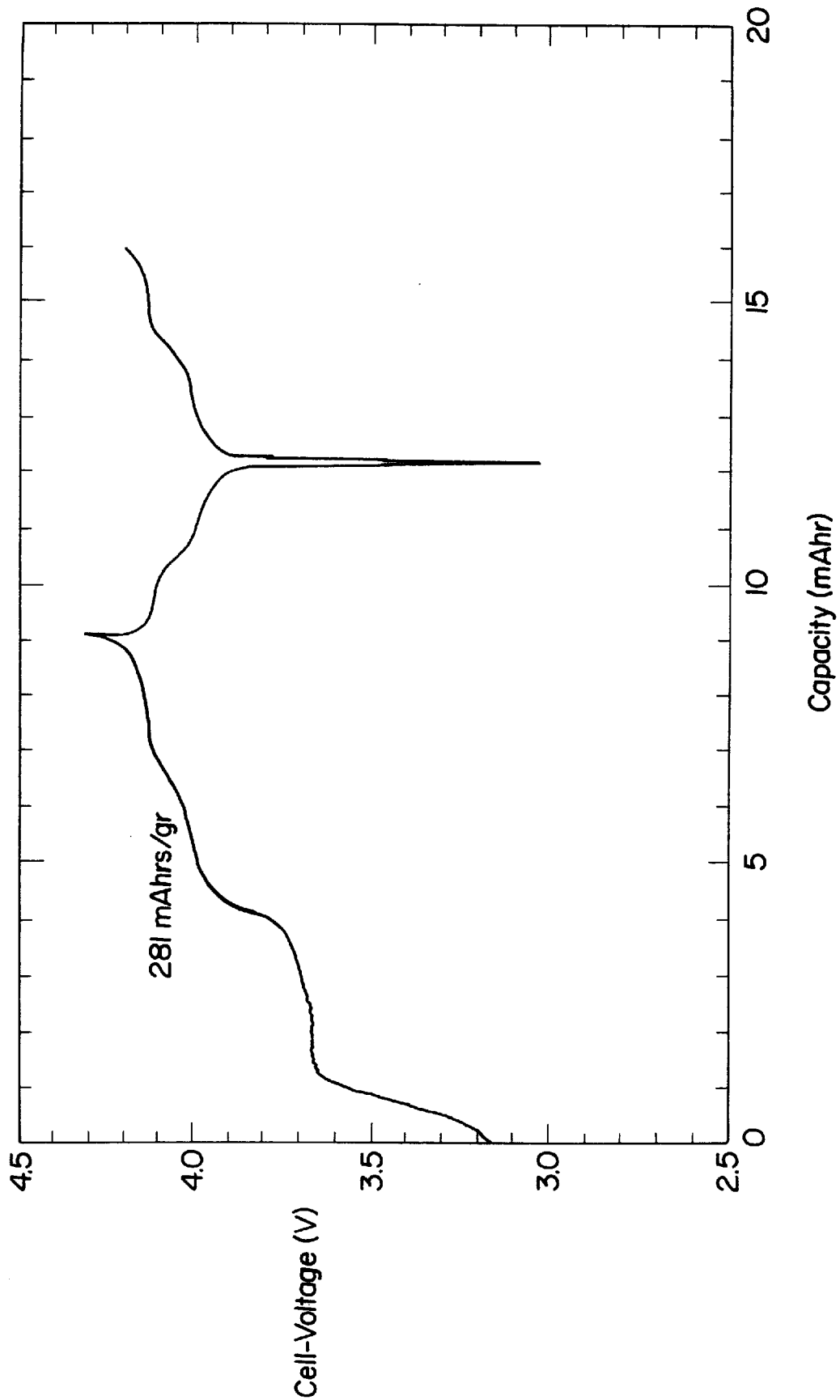
FIG. 3 is a voltage/capacity plot showing cumulative capacity (mAh) for the LMO active material of the invention (tetragonal $Li_{2.2}Mn_2O_4$) cycled with a lithium metal counter-electrode using constant current cycling at +0.25 milliamps per square centimeter, between 3.0 and 4.3 volts, using 32 milligrams of the LMO active material. The electrolyte is one molar $LiPF_6$ in a solution of ethylene carbonate (EC) and dimethyl carbonate (DMC). The weight ratio of EC:DMC is 2:1.

FIG. 3 shows a voltage/capacity plot for a cathode having the lithium manganese oxide active material prepared according to the invention, cycled against a metallic lithium anode, using constant current cycling at about 0.25/0.25 $mA/Cm^2$. This constant current cycling is between about 3.0 volts and 4.4 volts. The half-cycle capacities are clearly highlighted. During initial charge on the first cycle, lithium ions are deintercalated from the $Li_2Mn_2O_4$. This first charge is equivalent to approximately 281 mAhrs/g based on the estimated active material weight, equivalent to about 1.86 moles of lithium extracted. Next, the cell is discharged, and a quantity close to 0.66 moles of lithium is reintercalated into the positive electrode. The reintercalation corresponds to approximately 97 mAhrs/g.

FIGS. 1, 2, and 3 show the clear advantage of having extra capacity in a rechargeable lithium ion, rocking-chair battery. In a rocking-chair battery, there is incurred a 10–20 percent first cycle loss due to passivation of the carbon electrode. Thus, lithium lost to the carbon electrode is not recoverable since it originates from the cathode. This loss is compensated for by adding the extra capacity in the form of extra lithium in the compound $Li_2Mn_2O_4$ of the invention, as contrasted to the conventional $LiMn_2O_4$. Advantageously, the tetragonal $Li_2Mn_2O_4$ of the invention may be used in combination with the normal spinel $Li_1Mn_2O_4$. By adding an appropriate amount of the tetragonal $Li_2Mn_2O_4$ to the spinel $Li_1Mn_2O_4$, there is provided excess lithium to compensate for a nominal 15 percent capacity loss. Thus, the conventional spinel electrode material may be doped with the $Li_2Mn_2O_4$ additive. Since the performance of the cell will be improved as any amount of $Li_2Mn_2O_4$ is added, there is no practical lower limit or upper limit as to the amount of $Li_2Mn_2O_4$ so included. The amount is greater than zero and up to 100 weight percent, since the $Li_2Mn_2O_4$ may constitute the sole active material. When used as an additive for lithium metal oxides, such as $LiMn_2O_4$, $LiNiO_2$, $LiCoO_2$ and the like, a practical range is 1 to 20 weight percent additive $Li_2Mn_2O_4$, based on 100 weight percent total active material. Thus, the $Li_2Mn_2O_4$ dopant/additive is usable with a variety of metal chalcogenide active materials to compensate for their first cycle loss.

Figure 4:
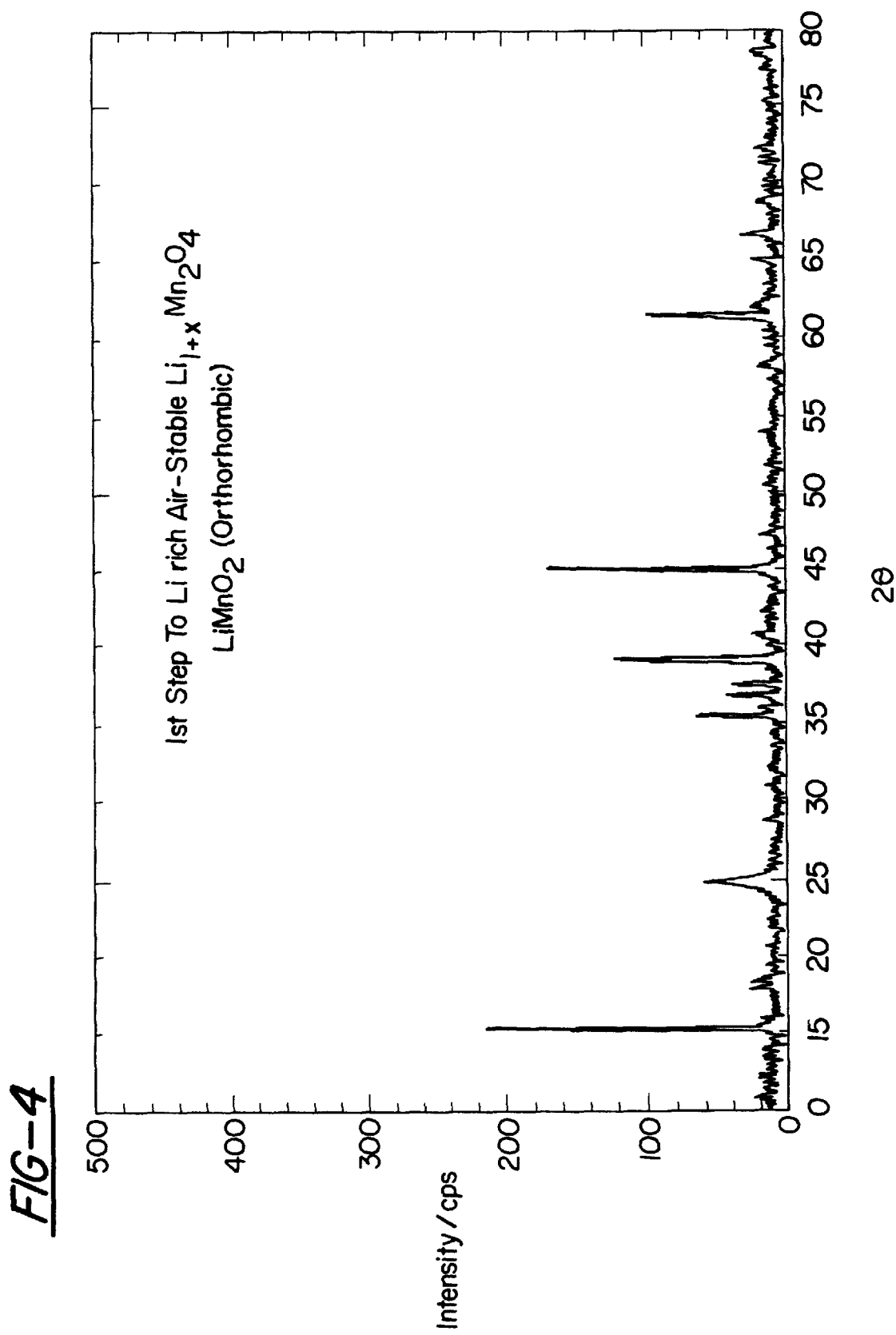
FIG. 4 is a diffractogram showing the results of an X-ray diffraction analysis of an orthorhombic lithium manganese oxide (LMO) compound. The orthorhombic $LiMnO_2$ is an intermediate product prepared according to the invention. The ortho-$LiMnO_2$ is a precursor to the final product, the tetragonal $Li_2Mn_2O_4$ product of the invention, prepared according to the invention. The X-ray diffraction was conducted using conventional CuKα type radiation.

FIG. 4 shows the results of an X-ray diffraction analysis of the precursor, intermediate orthorhombic $LiMnO_2$, prepared according to the invention. The X-ray diffraction was conducted using CuKα type radiation. The diffraction analysis shown in FIG. 4 indicates a structure with lattice parameters a=2.81 Å; b=5.74 Å; and c=4.58 Å; here $\alpha=\beta=\gamma=90$ degrees. This structure could only be indexed to an orthorhombic system, space group Pmmn, with these parameters. (Refer to the Table of Structures.)

The structure of FIG. 4 is clearly different than the basic spinel structure of $Li_1Mn_2O_4$, which is shown by comparison in FIG. 6. The compound of FIG. 6, the conventional $Li_1Mn_2O_4$, is a cubic structure in which A equals C. Both A and C are about 8.23 angstroms. The X-ray diffractogram of the conventional spinel $Li_1Mn_2O_4$ is different from the intermediate ortho-$LiMnO_2$ of the invention because the peak position is different, and the structure could only be refined/indexed to a cubic system, Fd3m space group. (Refer to the Table of Structures).

Figure 5:
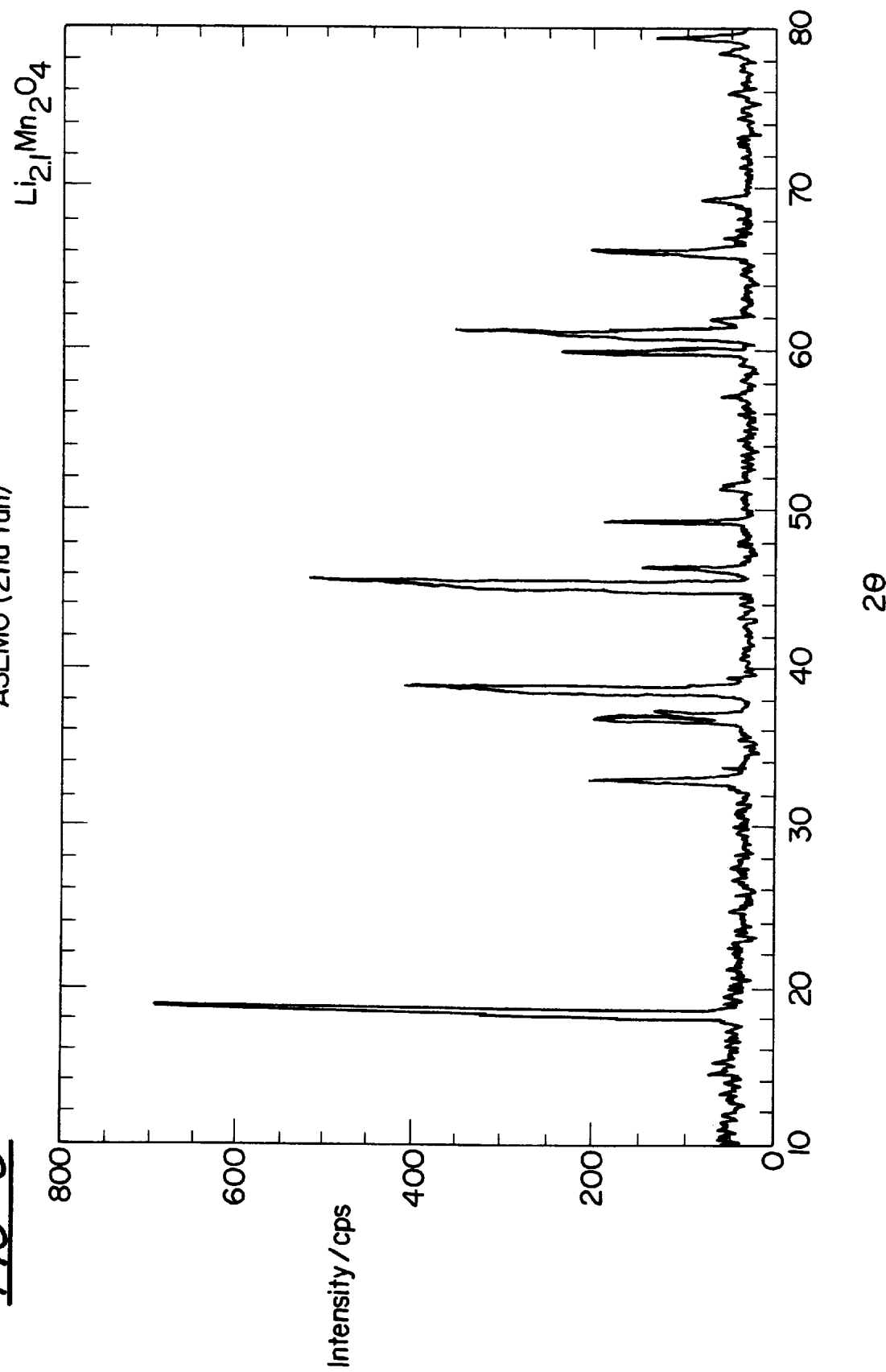
FIG. 5 shows the results of an X-ray diffraction analysis of the nominal $Li_2Mn_2O_4$ prepared according to the invention. The analysis was conducted using conventional CuKα type radiation. The $Li_2Mn_2O_4$ of the invention has a tetragonal crystal structure and characteristics as per FIGS. 1–3.

FIG. 5 is a diffractogram showing the results of an X-ray diffraction analysis of the nominal $Li_2Mn_2O_4$ compound prepared according to the invention, conducted using CuKα type radiation. The $Li_2Mn_2O_4$ of FIG. 5 has a tetragonal structure. This is different from a cubic spinel structure. In the tetragonal structure, the dimensions that define the unit cell, A and C, are different. For this novel tetragonal phase, the tetragonal space group in crystallography terms is $I4_1$-aid; A is about equal to 5.66, and C is about equal to 9.26 angstroms. More specifically, the compound of FIG. 5 has A=5.665±0.003 angstroms, and C=9.265±0.003 angstroms. It contains Li/Mn in atomic ratio of greater than or equal to 1.0 and less than or equal to 1.15. The structure of FIG. 5, being a tetragonal structure, is clearly different from the orthorhombic structure compound of FIG. 4 and the spinel $Li_1Mn_2O_4$ compound of comparative FIG. 6.

Other features that distinguish the tetra-$Li_2Mn_2O_4$ (FIG. 5) from the ortho-$LiMnO_2$ (FIG. 4), and the spinel $LiMn_2O_4$ are the different peak positions, as well as the number of peaks and the different lattice parameters that belong to a tetragonal system space group (for $Li_2Mn_2O_4$) and an orthorhombic system space group for $LiMnO_2$. (Refer to the Table of Structures).

The advantages of the tetragonal $Li_2Mn_2O_4$ of the invention can be further understood by observing its remarkable stability against degradation by air and moisture. Even after weeks of exposure to ambient conditions, there is no sign of oxidation or of crystal structure change of the compound. One would have expected that the $Li_2Mn_2O_4$, having both manganese atoms in the +3 state, a reversion of a proportion of same to the +4 state would occur. However, remarkably, the product of the invention maintains all Mn in the $Mn^{+3}$ condition. This is in remarkable contrast to former methods of attempting to form a lithium-rich spinel. In an attempt to form Li-$Mn_2O_4$ with x greater than 1, by inserting extra lithium in the basic spinel structure, a lithium-rich compound is formed. However, the amount of lithium added is only equal to about 1.25 Li, and much less than 2. It has been found that this spinel structure is not air-stable. Further, the potential for lithium deintercalation in such lithium-rich spinel is below 3 volts and on the order of 2.9 volts. For example, the lithium-rich spinel prepared by Tarascon, described in the Journal Electrochemical Society, Vol. 138, No. 10, October 1991, shows deintercalation at about 2.9 volts. This is below the range of over 3 volts (and close to 3.6 volts) for the $Li_2Mn_2O_4$ of the invention. This demonstrates the strikingly different behavior between the lithium-rich spinel compound of Tarascon, which is not air-stable, whether prepared chemically or electrochemically, and which operates below 3 volts; versus the lithium-rich tetragonal advantageously, the tetra-compound of the invention which is air-stable and operates above 3 volts and, more specifically, above 3.5 volts.

In summary, the $Li_2Mn_2O_4$ of the invention has a unique tetragonal system structure, which is different from the simple cubic (isometric) system structure of $LiMn_2O_4$ and different from the orthorhombic structure of $LiMnO_2$. As described earlier with respect to FIG. 1, there is a monotonic increase in potential up to about 3.6 volts, where a plateau is observed. The first region, not being a plateau, indicates a single domain (one phase). The second region is a plateau, and indicates the co-existence of two phases (tetragonal and cubic), hence the big sharp peak in the differential plot of FIG. 2. This is referred to as the nucleation of the cubic phase. The peaks, or area under the peaks, represent the excess capacity between 3.4 and 3.8 volts. The tetragonal product of the invention, as prepared, is light gray in appearance. When cycled in a cell and transformed to the cubic spinel phase as described above, its appearance is darker; gray to dark gray. This unique material, and its distinctive performance when used in a cell, are not known to have heretofore been described. The unique tetragonal $Li_2Mn_2O_4$ of the invention in its initial as-prepared condition is a solid solution, as only one phase exists at its initial lithium concentration (X=2). The shift, or nucleation, of another phase is related to the thermodynamics of the deintercalation/intercalation behavior and how the structure changes to release and insert lithium to minimize the total energy of the system. Advantageously, the tetragonal material of the invention exhibits two voltage plateaus above about 3 volts. Such plateaus are present above about 3.5 to 3.6 volts. Advantageously, after satisfying the need to compensate for initial capacity loss, the material of the invention in its transformed state is capable of cycling at the highly desirable 4-volt plateau. Here it maintains its single phase cubic spinel structure, characteristic of spinel $LiMnO_2$. Thus, the unique $Li_2Mn_2O_4$ material of the invention is highly desirable as it avoids operation at the less desirable 3-volt plateau and cycles reversibly at the 4-volt plateau.

Table of System Structures

|  | CUBIC $LiMn_2O_4$ | ORTHORHOMBIC $LiMnO_2$ | TETRAGONAL $Li_2Mn_2O_4$ |
|---|---|---|---|
| a. | 8.235 ± 0.004 | 2.81 | 5.665 ± 0.003 |
| b. | 8.235 ± 0.004 | 5.74 | 5.665 ± 0.003 |
| c. | 8.235 ± 0.004 | 4.58 | 9.265 ± 0.003 |

NOTE:
In all systems, $\alpha = \beta = \gamma = 90°$; and the ± variability for the orthorhombic parameters is similar to the other two structures. All values are in angstroms Å.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

We claim:

1. A lithium ion battery which comprises a positive electrode and a negative electrode, said positive electrode comprising a lithium manganese oxide active material which is initially a single phase oxide of lithium (Li) and manganese (Mn) with a tetragonal crystal structure with the lattice parameters a=5.665 Å±0.003 Å and c=9.265 Å±0.003 Å, and containing Li/Mn atomic ratio of greater than or equal to 1.0 and less than or equal to 1.15, nominally $Li_2Mn_2O_4$; and when Li ions are deintercalated (extracted) from said $Li_2Mn_2O_4$ at first and second voltage plateaus as said battery is charged, the crystal structure is transformed to a cubic spinel structure characterized by lattice parameter a=8.235 Å±0.004 Å; and on subsequent reinsertion and extraction of lithium by cycling said battery at said second voltage plateau, said cubic spinel structure is maintained.

2. A lithium ion battery according to claim 1 wherein said negative electrode comprises an intercalation active material.

3. A method of operating a lithium ion battery, having positive and negative electrodes, which comprises the steps of:

a. providing a positive electrode having a lithium-rich active material comprising tetragonal lithium manganese oxide, represented by the nominal formula $Li_2Mn_2O_4$;

b. deintercalating lithium ions from said positive electrode active material at first and second voltage plateaus, and transferring said deintercalated lithium ions to active material of said negative electrode for intercalation therein to charge said battery;

c. removing a portion of said transferred lithium ions from said negative electrode for reinsertion into said positive electrode active material to discharge said battery at said second voltage plateau; and then d. deintercalating lithium ions from said positive electrode active material at said second voltage plateau and transferring said deintercalated lithium ions to said negative electrode active material to recharge said battery at said second voltage plateau.

4. The method according to claim 3 wherein steps (c) and (d) are repeated in sequence.

5. A method of operating a lithium ion battery, having positive and negative electrodes, which comprises the steps of:

a. providing a positive electrode having a lithium-rich active material comprising a single phase tetragonal lithium manganese oxide, represented by the nominal formula $Li_2Mn_2O_4$, said lithium-rich compound characterized by first and second deintercalation voltage plateaus above about 3 volts versus lithium, and being lithium-rich as compared to conventional spinel $LiMn_2O_4$, which is characterized by a single deintercalation voltage plateau above about 3 volts versus lithium;

b. deintercalating lithium ions from said tetragonal lithium manganese oxide at first and second voltage plateaus, and transferring said deintercalated lithium ions to active material of said negative electrode for intercalation therein to charge said battery at a voltage sufficient to transform said tetragonal lithium manganese oxide to a single phase cubic structure;

c. removing a portion of said transferred lithium ions from said negative electrode for reinsertion into said positive electrode to discharge said battery at said second voltage plateau, while maintaining said single phase cubic structure; and then d. deintercalating lithium ions from said positive electrode at said second voltage plateau and transferring said deintercalated lithium ions to said negative electrode active material to recharge said battery at said second voltage plateau, while maintaining said single phase cubic structure;

whereby, the amount of lithium reversibly cycled at said second plateau by said lithium-rich compound is greater than the amount of lithium reversibly cycled at said single plateau by said conventional spinel.

6. The method according to claim 5 wherein, in step (b), said tetragonal structure has lattice parameters a=b=5.665 Å±0.003 Å and c=9.265 Å±0.003 Å and is transformed into said cubic structure characteristic of a spinel $LiMn_2O_4$ having lattice parameters a=b=c=8.235 Å±0.004 Å.

7. A method of chemically preparing a compound of the nominal general formula $Li_xMn_2O_4, x \geq 2$, having a tetragonal structure and excess lithium as compared to conventionally chemically prepared spinel $LiMn_2O_4$, which method comprises the steps of:

a. preparing a mixture of $\beta MnO_2$ particles (beta manganese dioxide powder) and lithium carbonate particles (powder), each in an amount sufficient to provide about 1 atomic unit of Li for each 1 atomic unit of Mn;

b. performing a first stepwise heating of the mixture to a first temperature of about 600° C. and then to a second temperature of about 845° C., in an atmosphere which is inert to slightly reducing;

c. grinding the product of step (b) and mixing said ground product with added particles of lithium carbonate;

d. performing a second stepwise heating of the mixture of step (c) to a first temperature of about 600° C., and then to a second temperature of about 975° C. in an atmosphere which is inert to slightly reducing; and then e. quenching the particles of step (d) by rapidly cooling the particles from said second elevated temperature.

8. The method according to claim 7 wherein said first stepwise heating comprises heating the mixture to said first temperature of about 600° C., and maintaining said 600° C. temperature for about 12 hours, and then increasing the temperature of the mixture from about 600° C. to about 845° C., and then maintaining said 845° C. temperature for about 36 hours, and maintaining said atmosphere throughout said first stepwise heating.

9. The method according to claim 7 wherein said second stepwise heating is conducted by heating the mixture to a first temperature of at least about 600° C. and maintaining said 600° C. temperature for about 12 hours, and then increasing the temperature to a second temperature of about 975° C., and maintaining said 975° C. temperature for about 36 hours, and maintaining said atmosphere throughout said second stepwise heating.

10. The method according to claim 7 wherein the temperature is increased at a ramp rate of about 2° C. per minute to achieve said 600° C. temperature, and then to achieve said 845° C. temperature in said first stepwise heating, and wherein said ramp rate is used in said second stepwise heating to said 600° C. temperature, and then to said 975° C. temperature.

11. The method according to claim 7 wherein the heating steps are conducted in a reaction vessel and cooling is conducted by cooling an exterior surface of said reaction vessel with water or equivalent heat transfer means to a temperature of 100° C., or less.

12. The method according to claim 7 wherein said $\beta MnO_2$ is prepared by heating electrochemical manganese dioxide to a temperature of at least about 400° C.

13. A method of chemically preparing a compound of the nominal general formula $Li_xMn_2O_4, x \geq 2$, having a tetragonal structure and excess lithium, as compared to conventionally chemically prepared spinel $LiMn_2O_4$, which method comprises the steps of:

a. preparing a mixture of $\beta MnO_2$ particles (beta manganese dioxide powder) and lithium carbonate particles (powder), each in an amount sufficient to provide about 1 atomic unit of Li for each 1 atomic unit of Mn;

b. performing a first stepwise heating of the mixture, in an atmosphere which is inert to slightly reducing, to form an orthorhombic compound of the nominal formula $LiMnO_2$;

c. grinding the product of step (b) and mixing said ground product with added particles of lithium carbonate;

d. performing a second stepwise heating of the mixture of step (c) in an atmosphere which is inert to slightly reducing, to transform said orthorhombic $LiMnO_2$ to tetragonal $Li_2Mn_2O_4$; and then e. quenching the particles of step (d) by rapidly cooling the particles to maintain said tetragonal structure stabilized against decomposition in air.

14. The method according to claim 13 wherein said first stepwise heating comprises heating the mixture to a first temperature of about 550° C. to about 650° C., and maintaining said temperature for about 6 to 24 hours; and then increasing the temperature of the mixture to a second temperature of about 800 to 900° C., and then maintaining said second temperature for about 24 to 72 hours; and maintaining said atmosphere throughout said first stepwise heating.

15. The method according to claim 13 wherein said second stepwise heating is conducted by heating the mixture to a first temperature of about 550 to 650° C., and maintaining said first temperature for about 6 to 24 hours; and then increasing the temperature to a second temperature of about 950 to 1050° C. and maintaining said second temperature for about 24 to 72 hours; and maintaining said atmosphere throughout said second stepwise heating.

16. The method according to claim 13 wherein said first and second stepwise heating are each conducted at a ramp rate of about 2° C. per minute.

17. The method according to claim 13 wherein the first stepwise heating comprises heating the mixture for at least about 6 hours at a temperature of at least about 550° C.; and then at least about 24 hours, at a temperature of at least about 650° C.

18. The method according to claim 13 wherein the second stepwise heating comprises heating the mixture for at least about 6 hours at a temperature of at least about 600° C.; and then at least about 36 hours, at a temperature of at least about 975° C.

* * * * *